United States Patent [19]

Jahnig

[11] 4,170,878
[45] Oct. 16, 1979

[54] ENERGY CONVERSION SYSTEM FOR DERIVING USEFUL POWER FROM SOURCES OF LOW LEVEL HEAT

[76] Inventor: Charles E. Jahnig, 5 Auldwood La., Rumson, N.J. 07760

[21] Appl. No.: 732,050

[22] Filed: Oct. 13, 1976

[51] Int. Cl.² ............................................. F03G 7/04
[52] U.S. Cl. ..................................... 60/641; 60/325; 60/516
[58] Field of Search ................. 60/325, 508, 509, 511, 60/512, 514, 515, 641, 516, 413

[56] References Cited

U.S. PATENT DOCUMENTS

| | | | |
|---|---|---|---|
| 411,605 | 9/1889 | McTighe | 60/511 |
| 1,429,281 | 6/1890 | McTighe | 60/511 |
| 1,493,368 | 5/1924 | Merz | 60/641 |
| 3,805,515 | 4/1974 | Zener | 60/641 |
| 3,896,622 | 7/1975 | Daniello | 60/641 |
| 3,928,145 | 12/1975 | Othmer | 60/641 X |
| 4,031,704 | 6/1977 | Moore et al. | 60/413 X |

Primary Examiner—Allen M. Ostrager
Assistant Examiner—Stephen F. Husar
Attorney, Agent, or Firm—Edward J. Brenner

[57] ABSTRACT

An energy conversion system for deriving useful power from the thermal gradients in the ocean, or from solar, geothermal, or other sources of low level heat, by using warm water to heat a confined working gas such as air whereby a pressure increase results due to warming the gas, arranging so that the expansion moves a piston or other device to extract power, and then cooling the gas and compressing it back to initial conditions while directly or indirectly contacting it with cooler water to thereby decrease the work needed for recompression. Net useful work results from the difference between the work of expansion at higher temperature and the work of recompression at lower temperature.

33 Claims, 5 Drawing Figures

ENERGY CONVERSION SYSTEM FOR DERIVING USEFUL POWER FROM SOURCES OF LOW LEVEL HEAT

BACKGROUND OF THE INVENTION

1. Field of the Invention

The present invention relates to energy conversion systems for deriving useful power from sources of low level heat such as thermal gradients in the ocean, or from solar, geothermal or other sources of low level heat and more particularly by using warm water to heat a gas, expanding the gas to extract power and then cooling and compressing the gas with cooler water back to initial conditions.

2. Description of the Prior Art

Designs now being proposed for Ocean Thermal Energy Conversions (OTEC) plants nearly all use conventional tubular heat exchangers to vaporize a working fluid, such as ammonia, using heat from a warm water source, then employing the ammonia vapor to drive a turbine, and thereafter condensing the ammonia vapors by indirect exchange with cold water brought up from the bottom. An early "open cycle" design used water vapor from the warm water as the working fluid in order to avoid the very expensive and troublesome indirect heat exchangers, but this system requires an extremely large turbine. Designs using ammonia or other working fluid are now receiving intensive attention and study, and now appear to be generally preferred.

However, these designs all require enormous surface areas in tubular or other indirect heat exchangers because the operation inherently has a very low conversion efficiency, typically 2 to 3%, and so enormous amounts of heat must be transferred from water to ammonia or other working fluid. Moreover, this heat must be transferred at very small temperature differences, such as 2° to 5° F. to conserve the meager difference available between warm water at perhaps 80° and cold water at about 40°. For comparison, a conventional power plant will have 2000° or more on the heat source and roughly 100° on the cold receiver. For an OTEC plant many times more surface area will be required, presenting major problems with regard to cost, fouling/cleaning, and corrosion in an ocean environment, as well as the possibility of serious leaks. Titanium tubing has been proposed, using a wall thickness of only 0.03 inches to avoid intolerable cost, but this poses a major risk as regards mechanical integrity of equipment in such a hostile environment as the ocean.

While the present OTEC designs promise to provide power from an inexhaustible source at comparative cost and with minimum harm to the environment, there is considerable room for improvement in the areas of cost, reliability, fouling and maintenance, and materials of construction problems. Plastics are of great interest in that they are low-cost, easy to fabricate, and not attacked by salt water. However, they have not been suitable for heat exhcnagers because of poor heat transfer properties. Heat exchangers are the largest, most costly, and most critical part of conventional systems.

Theoretically, the maximum efficiency possible for such energy conversion is given by the relationship:

$$E=(T_1-T_2)/T_1$$

where E is fractional efficiency, $T_1$ is temperature of the warm source, and $T_2$ is temperature of the cold receiver. For a typical OTEC case having 80° warm water and 40° cold water, the theoretical maximum efficiency is 7.4%. Actual designs can achieve only 2.5 to 3% efficiency, allowing for practical heat exchangers and "parasitic" power losses for water pumps and other auxiliaries.

In general, the designs being pursued are based on evaporating a liquid at about constant pressure, with the result that all of the heat input takes place at nearly constant temperature, thus preventing the application of countercurrent or crossflow heat exchange over a maximum practical temperature range. Moreover, the latent heat of condensation is finally rejected to the cold receiver, again at nearly constant temperature.

SUMMARY OF THE INVENTION

The present invention provides a practical method to obtain useful energy from the warm and cold ocean water by directly contacting warm water with a gas such as air in a confined zone to cause an increase in pressure, then expanding the gas while continuing to supply heat from the warm water, and extracting power from the expansion by means of a piston or other device. The gas is then cooled and recompressed in direct contact with cold water through part or all of the compression cycle, so that the cycle can be repeated. One piston can serve two chambers of confined working gas connecting to opposite sides of the piston, whereby much of the work for compression is supplied directly from expansion so as to minimize the amount of power that is handled via auxiliary facilities. At pressure levels above about 10-20 atmospheres, it becomes desirable to control solubility of gas in water, so instead of directly contacting the air with seawater, warm water is first used to warm a heat absorbing packing, then the water flow is discontinued while air is passed through the packing to warm the gas. Similar operations are used in the cooling part of the cycle. The invention is also useful to derive energy from solar collectors, geothermal sources, etc., and for "bottoming" to make use of low level heat rejected from power stations using nuclear or fossil fuel. It is an object of this invention to provide improvements by making basic modifications to the system design which eliminate the use of indirect exchangers, and allow using air as the working fluid instead of ammonia, propane, or fluorinated compounds, while at the same time providing a more effective and practical way to recover energy from low level heat sources, and at lower cost.

One application of my invention employs direct contact of water with air as the working gas, to provide heat exchange together with effective countercurrent staging. As a result, the temperature range over which the working fluid operates is increased along with efficiency. Thus, with 80° warm water and 40° cool water, it becomes practical to operate over a range of 30° (75° to 45°) giving a maximum efficiency of 5.7% according to the previous equation, compared to the range of only 20° and an efficiency of 3.7% in some comparable designs using indirect heat exchange with ammonia.

A further advantage for the new system is that it becomes practical to superheat the warm water by solar radiation in a confined zone at the surface. This may not be practical in alternative systems such as the ammonia type.

By using gas as the working fluid, my invention avoids losses due to latent heat, and introduces the capability for effective use of countercurrent and crossflow heat exchange and staging where applicable. Direct contact between air and water provides surface for heat transfer at relatively low cost, so a large surface area can be justified. This can allow heating or cooling the water over a greater temperature range, e.g., 5° to 10° F. compared to the usual 2° to 5°, to thereby decrease the water flow rate required. Since flow rates of both warm and cool water are very large, the resulting savings can be considerable in costs and pumping power.

BRIEF DESCRIPTION OF THE DRAWINGS

The foregoing and other objects, advantages and features of the present invention will be apparent from the following description of several embodiments of the present invention taken in connection with the accompanying drawings in which.

DESCRIPTION OF THE PREFERRED EMBODIMENTS

Figure 1:
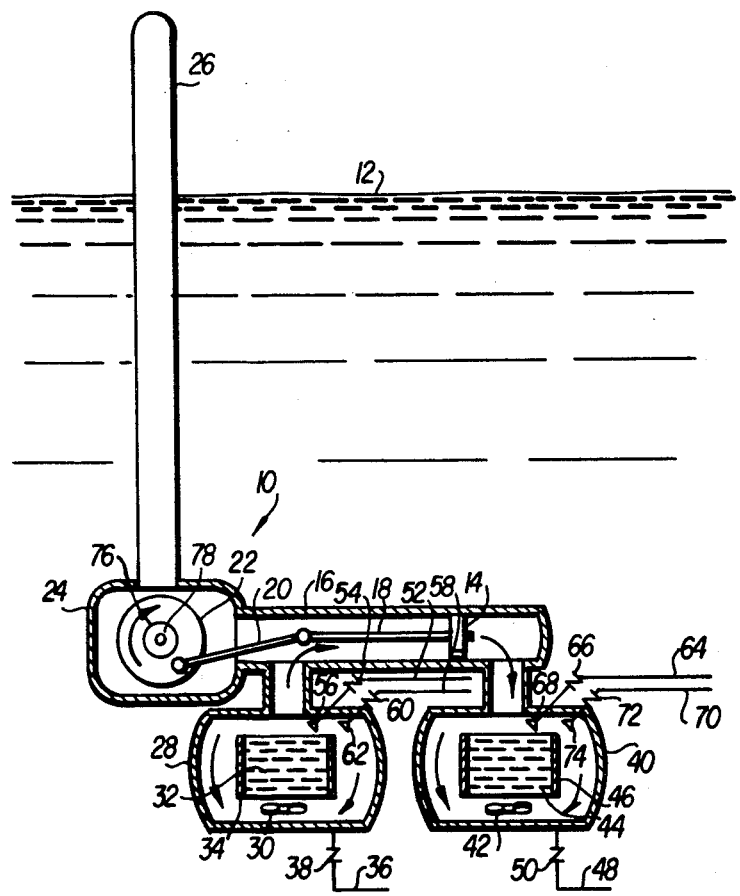
FIG. 1 is a schematic side view of an OTEC plant constructed in accordance with the present invention and designed for mid-depth ocean operation.

Basically, OTEC plants may be classed into three broad groups: an ocean surface or near ocean surface location, mid-depth ocean location at 200 to 600 feet, for example, and an ocean bottom location that may be 1000 feet deep or more. The surface location is easily accessible to ships and lends itself to industrial manufacturing and a "floating city" as part of the OTEC complex. Solar collectors can be incorporated to superheat the warm water. Mid-depth location avoids the major wave action associated with the surface, and the design pressures are moderate, while access to the surface can be maintained by using a vertical tower of reasonable size. The bottom location eliminates the long heavy mooring cables, or alternative powered position-holding system needed in the two preceding cases, but is subject to very high pressures and decreased accessiblity. It is also subject to fouling due to benthic marine life. The surface location is also subject to fouling from algae, barnacles, etc., while the mid-depth location should be less susceptible to fouling. Therefore the primary description that follows will be given for a mid-depth ocean location by way of example, but it should be clearly understood that the new improved system is intended equally for use at the surface or on the bottom, with suitable modifications in design for adaption to the considerable change in environment.

The specific elements of my system include a tank or vessel containing a working fluid such as a gas or air. The air is alternately warmed and cooled, whereby the expansions and contractions move a piston, bellows, diaphragm, or other device to develop power output. The power can appear as shaft work driving a flywheel, while the net work output can be used as such or to drive an electrical generator, or for other purposes.

Work is taken out during expansion, but considerable work must be put back in during compression at the lower temperature. This difference, or net work output, is only perhaps 5% of the gross power operating, so it is apparent that the usual turbine expanders and compressors are not suitable in that their efficiency is not much more than 90% and they would leave little or no net power output.

My design used a low friction piston operating in a cylinder to handle the work output and input. Preferably, one cylinder and piston serve two tanks (or more) connecting to opposite ends of the cylinder so that one side is in the expansion part of the cycle while the other side is in the compression part of its cycle. Then the work available from expansion provides most of the work for compression, minimizing the forces on the piston rod, and the shaft work that is handled externally. While the amount of work taken out during expansion exceeds that required for compression, it is not completely in the proper balance timewise in this simple system, so a flywheel is used to store power and supply it as needed. More than two cylinders can be connected to the same flywheel to give a more even power balance.

Preferably, heat is supplied during the warm part of the cycle by direct contact of the gas with warm water, for example by spraying the water through the tank or cylinder. Spraying down through the tank tends to give countercurrent heat transfer as well as staging, thereby minimizing the water flow rate required, and increasing the temperature change on the water flowing through. Open mesh packing, low pressure drop trays, etc., can be used to improve contacting and staging. In simple terms, the ideal is to first heat the gas to warm water temperature at constant volume to generate maximum pressure, and then maintain this temperature during expansion. In practical systems this ideal can be approached but not attained.

Next the gas is cooled, again by direct contact with a spray using cool water, and the gas is then compressed while cold water sprays maintain the gas at minimum practical temperature. As will be discussed later, the water sprays may be shut off part way through the expansion or contraction, resulting in decreased net power output but a higher thermal efficiency that can approach the ideal Carnot efficiency.

The work for isothermal expansion or compression of an ideal gas is given by:

$$W = RT \ln(V_2/V_1)$$

where W is the work in Btu/mol of gas, R is the gas constant 1.99, and $\ln V_2/V_1$ is the natural logarithm of the ratio of final to initial gas volume. Net work output is the work of expansion minus that of compression, which values are in the ratio of the corresponding absolute temperatures. In a practical system there are significant debits due to inefficiencies and "parasitic" losses such as water pumps, etc., that may consume 20% of the net power.

Heat input during expansion ideally is equal to the work output plus the sensible heat added to warm the gas up to the higher temperature. Efficiency is then the net work output divided by the heat input. For various cases of interest on OTEC this ideal efficiency is 4 to 8% without superheat, and 5 to 15% or more when providing solar collectors to superheat the warm water. Practical systems can have about 80% of these ideal efficiencies.

Various types of equipment and arrangements thereof will be described for the purpose of illustration, but are not intended in any way to limit the broad scope and potential applications of the basic invention. To mention only a few uses other than OTEC, one use is for "bottoming" on conventional power plants to generate additional power from low level heat. Nuclear plants have especially large amounts of such waste heat that can cause thermal pollution. Moreover, the invention can be adapted to use heat *directly* from the nuclear reactor and eliminate the steam cycle. Efficiency of the plant can thereby be improved considerably, to perhaps 40% versus the present 30% or less.

An excellent prospect is to use the system in combination with solar collectors to provide shaft work or electricity. A warm fluid temperature of 190° F. can be obtained, which is much higher than available from warm ocean water and more than compensates for the loss of a low temperature ocean heat sink. One of the limitations of solar energy today is the need for a new engine to use low level heat effectively, and it appears that OTEC technology will be useful here. Geothermal heat is another good application, since it usually provides heat at 150° to 300° F.

While the concepts have been put in simple terms for greater clarity and understanding, the task of combining and integrating these essential operations into a workable and practical system has been neither simple nor straightforward. In part, this results from the low theoretical efficiencies and the high gross work loads. Thus, the best turbines with 90% efficiency, operating on the working gas would leave no net output. Moreover, for an OTEC plant, the buoyancy of the system and tanks is a profound concern which presented formidable obstacles before the problems were solved. Also, contacting between gas and water is easy to visualize, but countercurrent action with staging is desired, together with tolerable pressure drop on the water and air flows, all with a cyclic operation imposed.

Before going into specific design details, a general alternative will be described that allows extracting the net work from the system by transferring it to a liquid, such as water, that can then be run through a turbine in continuous steady state operation. This turbine operates on only the *net* power output; consequently, a turbine efficiency of 90% is quite acceptable. In this alternative, a "free" piston is used in a vertical cylinder, with water above the free piston and working gas below in communication with the gas being heated and cooled.

Starting with the free piston at the top of the cylinder, the working gas is cooled to pull the free piston downward. At the same time, a valve opens to allow water from a low pressure source to flow in above the piston to fill the space and generate a hydraulic head or pressure which helps to compress the cooled gas as the piston moves down to its lowermost position. Next the working gas is heated using warm water so that the pressure increases and it tends to expand, moving the piston upward. Water valves are switched at this time so as to discharge the water above the piston to a high pressure reservoir as the piston moves up. Water from the high pressure reservoir flows through a turbine and is returned to the low pressure reservoir that supplies water as described above. This arrangement provides a thermodynamically "reversible" operation, and is therefore highly efficient. A temperature change of 30° F. can provide 37 feet water head on the turbine at a nominal 20 atm. operating pressure.

Figure 2:
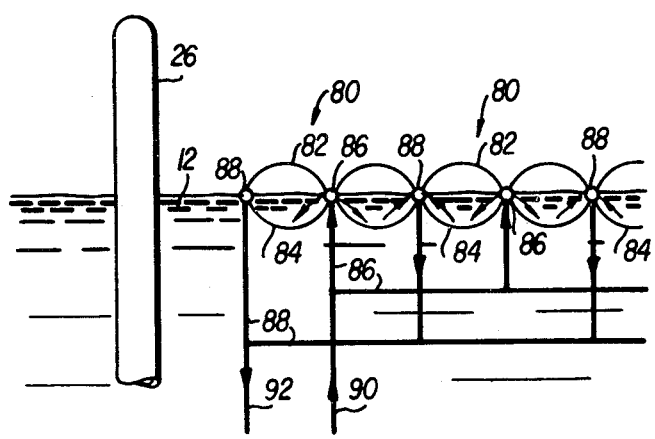
FIG. 2 is a schematic side view of a modification of the OTEC plant of FIG. 1 adapted to employ superheating by using solar collectors on the surface.

The preceding explanations together with subsequent discussion and specific examples will allow designing and evaluating a broad spectrum of applications and cases to optimize each system with regard to cost, engineering aspects, and other considerations. As the first specific example, an OTEC plant will be described for mid-depth ocean loction at 400 feet deep and a nominal operating pressure of 12 atmospheres on the working gas to minimize stress on the vessels. Two cases will be shown, one with and the other without superheating by using solar collectors on the surface. These examples are shown in FIGS. 1 & 2 respectively. Some parameters of interest are given in Table 1.

TABLE 1

|  | Superheat | No Superheat |
|---|---|---|
| Warm Water °F. | 95 | 80 |
| Cold Water °F. | 40 | 40 |
| Gas Temperature Max. °F. | 90 | 75 |
| Gas Temperature Min. °F. | 45 | 45 |
| Gas Pressure Max. Atm. | 18.2 | 14.9 |
| Gas Pressure Min. Atm. | 10.0 | 10.0 |
| Gas Volume Max. CF/mol | 36.8 | 36.8 |
| Gas Volume Min. CF/mol | 22.0 | 26.2 |
| Piston Displacement CF/mol | 14.8 | 10.6 |
| Work of Expansion Btu/mol gas | 562 | 363 |
| Work Compression Btu/mol | 516 | 343 |
| Net Work | 46 | 20 |
| Base Efficiency % | 5.3 | 3.5 |
| Btu from Warm Water Per Cycle | 877 | 573 |
| Temperature change on Water °F. | 15 | 10 |
| Water Flow/Cycle: lb./mol gas |  |  |
| Warm | 58.5 | 57.3 |
| Cold | 55.4 | 55.4 |
| Parasitic Losses, % of Net Work |  |  |
| Water Flow at 20 feet head | 9 | 19 |
| Gas circulation at 40 feet head | 4 | 10 |
|  | 13 | 29 |

In the first case (Column 1), water is superheated to 95°, which is well within the capability of solar collectors, but also below the lethal temperature of warm water life. Net work per mol of gas and thermal efficiency are both higher with superheating than without. Also, it becomes practical to use a greater temperature change on the warm and cold water flows. Parasitic power losses are lower with superheat, and as a percent on net power output the advantage is even more significant. Both cases use the same equipment volume at expanded conditions. This example illustrates the large advantage obtained by moderate superheat. In this example, the solar collection can be simply a confined layer of surface water that is drawn in for use. A depth of 10 feet supplies day to day storage.

It should not be concluded that superheat is necessary to have an attractive system, as will be shown next to two cases without superheat. The second column in Table 2 is the same case as the second column in Table 1, while the first column is for a new case wherein the water sprays are cut off part way throught the expansion or compression in order to conserve water.

TABLE 2

|  | Short Spray | Full Spray |
|---|---|---|
| Warm Water °F. | 80 | 80 |
| Cold Water °F. | 40 | 40 |
| Gas Temperature Max. °F. | 75 | 75 |

TABLE 2-continued

|  | Short Spray | Full Spray |
|---|---|---|
| Gas Temperature Min. °F. | 45 | 45 |
| Gas Pressure Max. Atm. | 14.9 | 14.9 |
| Gas Pressure Min. Atm. | 10.0 | 10.0 |
| Gas Volume Max. CF | 36.8 | 36.8 |
| Gas Volume Min. CF | 26.2 | 26.2 |
| Piston Displacement CF | 10.6 | 10.6 |
| Work of Expansion, Btu/mol gas | 360 | 363 |
| Work Compression Btu/mol gas | 348 | 343 |
| Net Work Btu/mol gas | 12 | 20 |
| Base efficiency % | 5.6 | 3.5 |
| Heat from Warm Water Btu/mol gas | 214 | 573 |
| Temperature Change on Water °F. | 10 | 10 |
| Water Flow/cycle lb./mol gas |  |  |
| Warm | 21.5 | 57.3 |
| Cold | 19.7 | 55.4 |
| Parasitic Losses - % of Net Work |  |  |
| Water Flow at 20 feet head | 12 | 19 |
| Gas Circulation at 40 feet head | 8 | 10 |
|  | 20 | 29 |

Modifying the spray pattern has increased efficiency considerably and cut the relative proportion of parasitic losses. These cases both use the same size vessels and the same operating pressure. Net work output is lower at the higher efficiency, and a choice between the two will depend on engineering, economic factors, etc.

Having presented some of the major features and advantages of the new system, a more detailed description of its character and operation will now be given, together with specific illustrations and design conditions which will define the system and point out modifications, combinations, and optiminzations that can be applied by those skilled in the art.

By way of example, a preferred embodiment of the invention will be described for application at mid-depth in the ocean at about 400 feet deep—below the level of wave disturbance but still with access to the surface by way of a vertical conduit. The system, operation, and parameters are as described in Table 1. Cycle length is about 0.002 hours (7.6 seconds) and water flows are maintained throughout most of the cycle but are shut off ½ to .1 second before expansion or compression is completed at the extremes of volume, in order to allow water drainage.

Contacting of water and air is carried out using an open mesh or pads as packing to improve contacting and also to provide very desirable staging which minimizes water consumption. Water flows downward and air upward through the packing which may for example extend through a height of 10 to 20 feet. Working for pumping the water is minimized by filling warm or cold water reservoirs while they are at a convenient low pressure level, and then pressure balancing the reservoir to the working chamber while the water is flowing to the appropriate contacting zone. A single contacting zone can be used, to which warm or cold water is supplied alternately.

A double acting piston is used, with gas expanded on one side, while gas is being compressed on the other side of the piston. Net work output is that from expansion at the higher temperature, minus the work needed for compression at the lower temperature. A flywheel or other device is used to balance the amount and timing of work input and output, connected to multiple cylinders. A 10° increase in the warm water temperature allows a corresponding 10° increase in the operating temperature for the warm part of the cycle. As a result, efficiency increases to 7.4% instead of 5.7%, according to the previous equation.

A second advantageous factor results from the water vapor pressure, which increases rapidly with temperature. Since direct contacting is used, the air will be approximately saturated with water at the higher temperature, thereby increasing its volume. Upon cooling, water vapor will condense. The effect then is to accentuate the change in volume and increase the net work output, especially at low operating pressures. For example, at 90° F. the water vapor will add about 5% to the gas volume.

Solar collectors have been developed that can generate water temperatures considerably higher than the 90° used in this example, and appear to offer great promise for use with the new OTEC system. Thus, at a reasonably warm water temperature of 150°, the system can realize 14.7% efficiency.

It will be seen that the very large exchangers required in alternative designs are a major cost item, and incur serious problems due to fouling and corrosion. A large conventional power plant burning coal may generate 1000 megawatts of electricity, and an OTEC plant of comparable size using exchangers would require about 90 million square feet of surface. Keeping this enormous surface area clean and free of leaks is a formidable undertaking in the ocean environment, but is no longer a problem in the new design which operates in a different manner so as to avoid the need for such exchangers.

It will now be shown how to increase the work output, still without using superheat. The change, illustrated in Table 3 is to raise the operating pressure to 20 atmospheres maximum, from the previous 14.9 atm.

TABLE 3

|  | High Pressure | Base |
|---|---|---|
| Warm Water °F. | 80 | 80 |
| Cold Water °F. | 40 | 40 |
| Gas Temperature Max. °F. | 75 | 75 |
| Gas Temperature Min. °F. | 45 | 45 |
| Gas Pressure Max. Atm. | 20.0 | 14.9 |
| Gas Pressure Min. Atm. | 10.0 | 10.0 |
| Gas Volume Max. CF | 36.8 | 36.8 |
| Gas Volume Min. CF | 19.5 | 26.2 |
|  | 17.3 | 10.6 |
| Work of Expansion Btu/mol gas | 681 | 363 |
| Work of Compression Btu/mol gas | 643 | 343 |
| Net Work Btu/mol gas | 38 | 20 |
| Efficiency % | 4.3 | 3.5 |
| Heat from Warm Water Btu/mol gas | 891 | 573 |
| Temperature Change on Water °F. | 10 | 10 |
| Water Flow/Cycle: lb/mol gas |  |  |
| Warm | 89.1 | 57.3 |
| Cold | 85.3 | 55.4 |
| Parasitic Losses, % of Net Work |  |  |
| Water Flow at 20 ft. head | 16 | 19 |
| Gas Circulation at 40 ft. head | 5 | 10 |
|  | 21 | 29 |

The first column in Table 3 shows the new case at higher pressure, while the second column is the same case as in the second column of Table 2 using full sprays. Again, the volume of tanks at maximum expansion has been kept unchanged. Although the losses are somewhat higher than the best case with partial sprays or with superheat, they can be further decreased by optimizing the design.

Increasing the maximum pressure (to more than 20 atmospheres) and compression ratio would give further improvement, for example, 4.24 compression ratio versus the above 2.12 would give 4.88% thermal efficiency, and the losses would be only 18.7% of net work output. A somewhat deeper location would minimize stresses on the vessel walls. However, at the higher pressure, air solubility in the water becomes significant, so consideration must be given to controlling loss of air, or replacing it. One way around the problem is to drop the minimum pressure to 5 atmospheres while maintaining the same 21.2 maximum pressure, giving a compression ratio of 4.24. This is a realistic basis for design, although in making comparisons and evaluations, allowance should be made for the fact that the 5 atmosphere case has a maximum gas volume about double that of the preceding two cases.

The preceding three comparisons have thus shown:
1. The beneficial application of solar collectors to provide warm water. In fact, they can be used to supply all of the heat input, as by using closed circuit recirculation of the warm water supply. This is a most promising approach in that it releases OTEC from the need for a warm water source, and the plants can then be considered for many other locations provided that a suitable cold receiver can be made available.
2. The application of partial use of water sprays in order to decrease water consumption and increase system efficiency. The sprays or other devices used for contacting gas and water can be discontinued during the latter part of the expansion or compression cycle, but in general will be operated in such a manner that the gas temperatures remain within a range bounded at the upper end by the warm water supply and at the lower end by the cold water temperature.
3. Increasing compression ratio on the working gas results in greater net work output per mol of gas, together with increased thermal efficiency and lower parasitic losses. This is to be balanced against the accompanying increased cost of equipment, and the complication that may result from significant solubility of air in water at pressures above 10-20 atmospheres.

Various alternatives can be combined to increase efficiency and work output beyond the specific examples given above, and design studies must be integrated with costs and economics in order to optimize an application. Such factors depend on cost of fuel, available technology, etc., and can change with time.

While the description so far has given a broad picture of the invention, with some modifications and applications, it will be found in making detailed designs that alternatives arise when selecting process design or equipment which can make a large difference in the economics. One such case is the means for introducing water into the zone for contacting with the working gas, when the latter is undergoing pressure cycles. A convenient way to handle this is to have a water reservoir which is filled at a time when the working gas is at low pressure, displacing gas back into the main vessel. Then the water reservoir is "pressure balanced" to the working gas zone or tank by opening a valve in connecting piping, whereby the water can now be fed to the contacting zone while requiring a pumping pressure build-up to overcome only the differential pressure across the sprays or other contacting devices, rather than the full system pressure. Preferably the reservoir is filled while connected to the main tank to thereby return the gas to the working zone. Of course, the reservoir can be a suitable confined zone within the main tank, since the volume of water used per cycle is only a small fraction of the tank volume.

A specific example is given below for an OTEC module developing 50 megawatts of gross power output, representing an attractive but not necessarily optimum case. The basis will be as shown in column one of the preceding Table 3 for mid-depth location operating between 10 to 20 atmospheres. Warm water is available at 80° F. Cycle time is an important variable since the work output increases with the number of cycles per hour. A cycle time of 0.002 hours or 7.6 seconds will be used.

Results are shown in Table 4.

TABLE 4

| OTEC at Mid-Depth Location | |
|---|---|
| Gross Electric Power Generated, megawatts | 50 |
| Amount of Working Gas, mols | 8,950 |
| Combined Tank Volume, CF | 329,000 |
| Bouyancy, short tons | 10,500 |
| Bouyancy, tons/KW gross | 0.21 |
| Warm Water Flow, CFS | 1,780 |
| Parasitic Losses MW | |
| Water Flow | 8.0 |
| Gas Circulation | 2.5 |
|  | 10.5 |
| Net Power Output, MW | 39.5 |
| Net Thermal Efficiency % | 3.4 |

Buoyancy in tons per kilowatt output is a major consideration in that it reflects the relative size of equipment, as well as to some extent the cost. For comparison with the above 0.21 tons/KW, a representative value for alternative designs is about 1.0 tons/KW when using indirect heat exchangers and ammonia as the working fluid. Moreover, cost per ton for the latter can be expected to be higher since the equipment is more complicated and requires more fabrication, and more labor to assemble. For example, the heat exchangers on warm and cold water may each have 120,000 tubes to be mounted in the tube sheets and carefully sealed against leaks.

Now referring to FIG. 1, reference numeral 10 designates an OTEC plant disposed at a mid-depth location below ocean surface 12. OTEC plant 10 includes a double acting piston 14 operatively disposed in cylinder 16. Piston 14 is connected to piston rods 18 and 20 which in turn are operatively connected to flywheel 22 disposed in housing 24. Tower 26 communicates with OTEC plant 10 via housing 24 to provide access to the surface.

Cylinder 16 communicates at its left end with tank 28 which contains fan 30 and baffles 32 mounted in cylindrical housing 34. Tank 28 is provided with a bottom drain line 36 which has a check valve 38 disposed therein. Cylinder 16 also communicates at its right end with tank 40 which contains fan 42 and baffles 44 mounted in cylindrical housing 46. Tank 40 is provided with a bottom drain line 48 which has a check valve 50 disposed therein.

Each of tanks 28 and 40 is equipped with means to spray alternately warm water and cold water therein as follows. Tank 28 is provided with warm water supply line 52 which has a valve 54 and spray nozzle 56 therein. Tank 28 is also provided with cold water supply line 58 which has a valve 60 and spray nozzle 62 therein. Tank 40 is provided with warm water supply line 64 which has valve 66 and spray nozzle 68 therein. Tank 40 is also provided with cold water supply line 70 which has a valve 72 and a spray nozzle 74 therein. Flywheel 22 is operatively connected to a power input device, turbine 76, by means of a common drive shaft 78.

The method of operation of OTEC plant 10 is as follows, selecting as a starting point a condition wherein the piston 14 is at the extreme right in cylinder 16 and wherein tank 28 is in its maximum warm condition and tank 40 is at its maximum cold condition. At this point, warm water obtained by pumping from an upper location in the ocean is sprayed into tank 40 through warm water supply line 64 and spray nozzle 68 by opening valve 66 (which has been closed). Fan 30 recirculates air upward through baffles 32 countercurrent to the warm water, and downward around the outside of cylindrical housing 34. Simultaneously, cold water obtained by pumping from a lower location in the ocean is sprayed into tank 28 through cold water supply line 58 and spray nozzle 62 by opening valve 60 (which had been closed). Fan 42 recirculates air upward through baffles 44 countercurrent to the warm water and downward around the outside of housing 46. As a result of the air being warmed in tank 40 increasing its pressure and air being cooled in tank 28 reducing its pressure, piston 14 is moved to the left in cylinder 16, driving flywheel 22 by means of connecting rods 18 and 20. A part of the energy so produced is stored in flywheel 22 with a portion of the energy being taken out in the form of useful work by driving turbine 76 by means of drive shaft 78.

When piston 14 reaches its extreme left position, warm water supply line 64 is shut off by closing valve 66 and cold water supply line 58 is shut off by closing valve 60. At this point, cold water obtained from a lower location in the ocean is sprayed into tank 40 through cold water supply line 70 and spray nozzle 74 by opening valve 72 (which had been closed). Fan 42 recirculates air upward through baffles 44 countercurrent to the cold water, and downward around the outside of cylindrical housing 46. Simultaneously, warm water obtained from an upper location in the ocean is sprayed into tank 28 through warm water supply line 52 and spray nozzle 56 by opening valve 54 (which had been closed). Fan 30 recirculates air upward through baffles 32 countercurrent to the warm water and downward and around the outside of cylindrical housing 34. As a result of the air being warmed in tank 28 increasing the pressure and air being cooled in tank 40 reducing its pressure, piston 14 is moved to the right in cylinder 16, driving flywheel 22 by means of connecting rods 18 and 20. Again, a part of the energy is stored in flywheel 22 with a portion of the energy being taken in the form of useful work by driving turbine 76 by means of drive shaft 78.

The system is then back to its starting point described above. The above process is then continued until flywheel 22 reaches its designed speed, at which point the energy output of the OTEC plant 10 is taken essentially completely by turbine 76. Water is drained from tank 28 through bottom drainline 36 and check valve 38 when the pressure of tank 28 is above ambient water pressure and is controlled to prevent escape of air. Likewise, water is drained from tank 40 through bottom drainline 48 and check valve 50 when the pressure of tank 40 is above ambient water pressure and is controlled to prevent escape of air.

Now referring to FIG. 2, reference numeral 12 again refers to the ocean surface and reference numeral 26 refers to access tower 26 for OTEC plant 10. Reference numerals 80 designate a series of solar collectors which may be constructed of plastic, having an upper transparent portion 82 serving as a solar window and a lower portion 84 serving as a trough. The solar collectors 80 are connected together in pairs by means of inlet manifold 86 and in alternating pairs by means of outlet manifold 88 as shown in FIG. 2. Inlet manifold 86 is connected to inlet line 90 and outlet manifold 88 is connected to outlet line 92.

The solar collectors 80 are operated in combination with OTEC plant 10 as follows. Used warm water discharged alternatively from tanks 28 and 40 via drain lines 36 and 48 is fed to inlet line 90 and then via inlet manifold 86 to the individual solar collectors 80 wherein the water is warmed as a result of sunlight through upper transparent portion 82 while the water passes through troughs 84. The warmed water is then collected from the solar collectors 80 through outlet manifold 88 and returned to OTEC plant 10 where it is fed alternatively into tanks 28 and 40 via warm water supply lines 52 and 54 respectively as described in detail in connection with FIG. 1.

Figure 3:
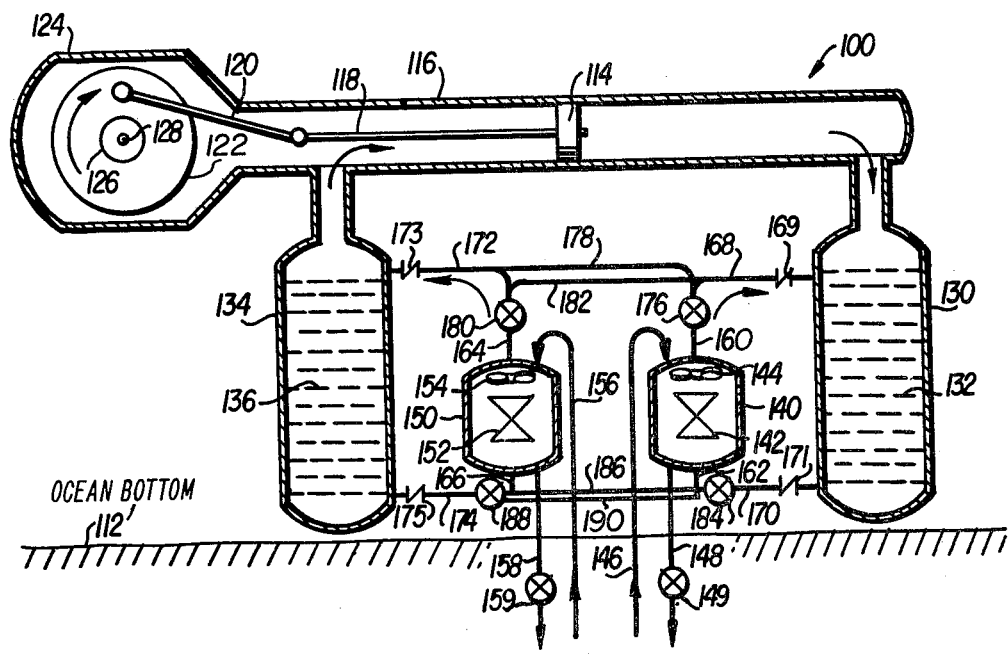
FIG. 3 is a schematic side view of an OTEC plant constructed in accordance with the present invention and designed for ocean bottom location operation.

To further show the broad application of the new system, a somewhat different design will now be defined for an OTEC plant located on the ocean bottom, at a depth of 2000–2500 feet. Results are summarized in Table 5, and the design is shown in FIG. 3. The second column of Table 5 shows the effect of increasing compression ratio and piston displacement.

TABLE 5

| OTEC at Bottom Location - ca. 2000 feet depth | | |
|---|---|---|
| Warm Water °F. | 80 | 80 |
| Cold Water °F. | 40 | 40 |
| Gas Max. °F. | 75 | 75 |
| Gas Min. °F. | 45 | 45 |
| Gas Pressure Max. Atm. | 72 | 80 |
| Gas Pressure Min. Atm. | 48 | 40 |
| Gas Volume Max. CF/mol | 8.12 | 9.75 |
| Gas Volume Min. CF/mol | 5.11 | 4.60 |
| Piston Displacement, CF/mol | 3.01 | 5.15 |
| Work of Expansion, Btu/mol gas | 433.8 | 741.7 |
| Work Compression, Btu/mol gas | 409.5 | 700.1 |
| Net Work, Btu/mol gas | 24.3 | 41.6 |
| Heat from Warm Water, Btu/mol gas | 644 | 952 |
| For 50 Megawatts Gross Power | | |
| Amount of Working Gas, mols | 13970 | 8170 |
| Combined Tank Volume, CF | 113,400 | 79660 |
| Bouyancy, short tons | 3,630 | 2550 |
| Bouyancy tons/KW | 0.073 | 0.051 |
| Warm Water Flow at 10° Δ T, CFS | 2,002 | 1730 |
| Parasitic Losses MW | | |
| Water Flow | 8.9 | 7.7 |
| Gas Circulation | 4.1 | 2.4 |
|  | 13.0 | 10.1 |
| Net Power Output MW | 37.0 | 39.9 |
| Net Thermal Efficiency % | 2.80 | 3.50 |

Buoyancy is quite low as a result of the relatively high pressure, meaning that the equipment size is small. It will be designed to stand the differential pressure encountered, but not the full operating pressure as would be necessary for surface equipment at the same high pressure. A cycle length of 0.002 hours has been used to allow comparison with previous examples, but this could easily be increased to 0.004 or more while still maintaining a very favorable low buoyancy. Increased pressure level, and higher pressure ratios are thus useful ways to minimize buoyancy and equipment size.

As mentioned before, air solubility in water at these high pressures should be taken into consideration. For the example case, air solubility is controlled by using a form of indirect heat exchange, but one that does not transfer heat through a costly metal surface, as in a tubular exchange, which would be seriously affected by fouling. Instead, water is flowed through a packed bed to warm the packing. Water flow is then stopped, and after draining, the working gas is circulated through the warm bed. In this particular design, separate beds are provided for warm and cold operations. A large surface area can be provided at low cost, and fouling does not seriously impair heat transfer to the gas. Solubility of air in the water is not a problem since there is only minor direct contact between water and air.

Now referring to FIG. 3, reference numeral 100 designates an OTEC plant constructed in accordance with the present invention and designed to operate on the ocean bottom 112. OTEC plant 100 is provided with a double acting piston 114 which is operatively disposed in in cylinder 116. Piston 114 is operatively connected by means of connecting rods 118 and 120 to flywheel 122 disposed in housing 124. Flywheel 122 is operatively connected to a turbine 126 by means of common drive shaft 128.

Cylinder 116 communicates at its right end with the top of tank 130 which is provided with a plurality of baffles 132 designed to give staging and limit mixing between water and air. Tank 130 is supported on the ocean bottom 112. Cylinder 116 communicates at its left end with the top of tank 134 which is provided with a plurality of baffles 136 designed similar to baffles 132. Tank 134 also is supported on ocean bottom 112.

OTEC plant 100 also includes a cold water contacting chamber 140 which contains therein a bed of conventional packing material 142 and a circulating fan 144 in its upper, inner portion. Chamber 140 is provided at its upper portion with a cold water inlet line 146 and with a cold water outlet line 148 at its bottom containing check valve 149. OTEC plant 100 also includes a warm water contacting chamber 150 which contains therein a bed of conventional packing material 152, similar to that contained in chamber 140, and a circulating fan 154 in its upper, inner portion. Chamber 150 is provided at its upper portion with a warm water inlet line 156 and with a warm water outlet line 158 at its bottom containing check valve 159.

Chamber 140 is provided at its top with a gas outlet line 160 and its bottom with a gas inlet line 162. Chamber 150 is provided at its top with a gas outlet line 164 and at its bottom with a gas inlet line 166. Tank 130 is provided at its top with a gas inlet line 168 and at its bottom with a gas outline line 170 having valve 171 therein. Tank 134 is provided at its top with a gas inlet line 172 and at its bottom with a gas outlet line 174 having valve 175 therein.

Gas outlet line 160 is provided with a three-way valve 176 which communicates with gas outlet line 168 and with line 178 which in turn communicates with gas inlet line 172 having a valve 173 therein. Gas outlet line 164 is provided with a three-way valve 180 which communicates with gas inlet line 172 and also with line 182 which in turn communicates with gas inlet line 168 having valve 169 therein. Gas outlet line 170 is provided with three-way valve 184 which communicates with gas inlet line 162 and with line 186 which in turn communicates with gas inlet line 166. Gas outlet line 174 is provided with three-way valve 188 which communicates with gas inlet line 166 and with line 190 which in turn communicates with gas inlet line 162.

OTEC plant 100 operates as follows, commencing with piston 114 at its far right position in cylinder 116. Tank 130 and chamber 140 at this point are each in their cold condition and tank 134 and chamber 150 at this point are each in their warm condition. In this example of the present invention, chamber 140 will always be in a cold condition by reason of cold water being introduced through inlet line 146 to the top of the bed of packing material 142 and withdrawn through outlet line 148. Also, chamber 150 will always be in a warm condition by reason of warm water being introduced through inlet line 156 to the top of the bed of packing material 152 and withdrawn through outlet line 158. The valves 169 and 171 are open and three-way valves 176 and 184 are set to circulate air through chamber 140 and tank 130 by means of fan 144. Likewise, valves 173 and 175 are open and three-way valves 180 and 188 are set to circulate air through chamber 150 and tank 134.

Now the valves 169, 171, 173 and 175 are shut off and warm water is passed through chamber 150 to warm the bed 152 to substantially warm water temperature. Similarly, cold water is passed through chamber 140 to cool the bed 142 to substantially cold water temperature. The valves 169, 171, 173 and 175 are now opened and three-way valves 176 and 188 are set to circulate air through chamber 140 and tank 134 by means of fan 144 to cool tank 130. Likewise, three-way valves 180 and 184 are set to circulate air through chamber 150 and tank 130 by means of fan 154 to warm tank 134.

As a result of heating the air in tank 130 and its expansion and cooling the air in tank 134, and its contraction, piston 114 moves to the left in chamber 116, driving flywheel 122 by means of connecting rods 118 and 120. A part of the energy so produced is stored in flywheel 122 with a portion of the energy being taken out in the form of useful work by driving turbine 126 by means of drive shaft 128.

When piston 114 reaches its position at the far left of cylinder 116, the valves 169, 171, 173 and 175 are shut off to stop circulation of air through the beds. Then cold water is circulated by pumping through chamber 140 by means of lines 146 and 148 to cool bed 142 and warm water is circulated by pumping through chamber 150 by means of lines 156 and 158 to warm bed 152. Bed 142 is then drained through line 148 and check valve 149 and bed 152 is drained through line 158 and check valve 159.

Now valves 169, 171, 173 and 175 are opened and three-way valves 176 and 184 are set to circulate the warm air in tank 130 through chamber 140 and tank 130 by means of fan 144 to thereby cool the air. Likewise, three-way valves 180 and 188 are set to circulate the cold air in tank 134 through chamber 150 and tank 134 by means of fan 154 to thereby heat the air. As a result of heating the air in tank 134 and its expansion and cooling the air in tank 130 and its contraction, piston 114 moves to the right in chamber 116, driving flywheel 122 by means of connecting rods 118 and 120. Again, a part of the energy so produced is stored in flywheel 122 with a portion of the energy being taken out in the form of useful work by driving turbine 126 by means of drive shaft 128. Multiples of chambers 150 and 140 can be provided to allow more time in the cycle for water to flow through the packing.

At full travel, piston 114 is at the far right and is at the starting position described above. The above process is then continued until flywheel 122 reaches its designed speed, at which point the energy output of the OTEC plant 100 is taken essentially completely by turbine 126.

One additional example will be given, for a 50 megawatt plant at an ocean surface location, using the "free piston"/water turbine system mentioned earlier. In this case, high buoyancy can be accommodated simply by having the system float, and hence does not introduce major design problems, although cost will tend to increase at higher buoyancy in that it reflects larger equipment. Minimum pressure is set at two atmospheres, corresponding to a submergence of only 33 feet, at which pressure the working gas is contacted directly with water for heat exchange. Parameters for this case are given in Table 6 for alternative pressure levels, both using a 0.002 hour cycle.

TABLE 6
OTEC at Surface Location

| | | |
|---|---|---|
| Gas Pressure, Max., Atm. | 3 | 4 |
| Gas Pressure, Min., Atm. | 2 | 2 |
| Warm Water in °F. | 80 | 80 |
| Cold Water in °F. | 40 | 40 |
| Gas Temperature Max. °F. | 75 | 75 |
| Gas Temperature Min. °F. | 45 | 45 |
| Gas Volume Max. CF | 195.0 | 195.0 |
| Gas Volume Min. CF | 122.7 | 92.0 |
| Piston Displacement CF | 72.3 | 103.0 |
| Work of Expansion Btu/mol gas | 433.9 | 741.7 |
| Work of Compression Btu/mol gas | 409.5 | 700.1 |
| Net Work Btu/mol | 24.4 | 41.6 |
| Heat from Warm Water Btu/mol gas | 644 | 952 |
| For 50 MW Gross Electric Power | | |
| Amount of Working Gas, mols | 13,900 | 8,200 |
| Combined Tank Volume, CF | 2,710,000 | 1,600,000 |
| Bouyancy, Short Tons | 86,700 | 51,200 |
| Bouyancy, Tons/KW | 1.73 | 1.02 |
| Warm Water Flow CFS | 1,940 | 1,690 |
| Parasitic Losses MW | | |
| Water Flow | 8.9 | 7.7 |
| Gas Circulation | 4.1 | 2.4 |
| | 13.0 | 10.1 |
| Net Power Output MW | 37.0 | 39.9 |
| Net Thermal Efficiency % | 2.80 | 3.49 |

Figure 4:
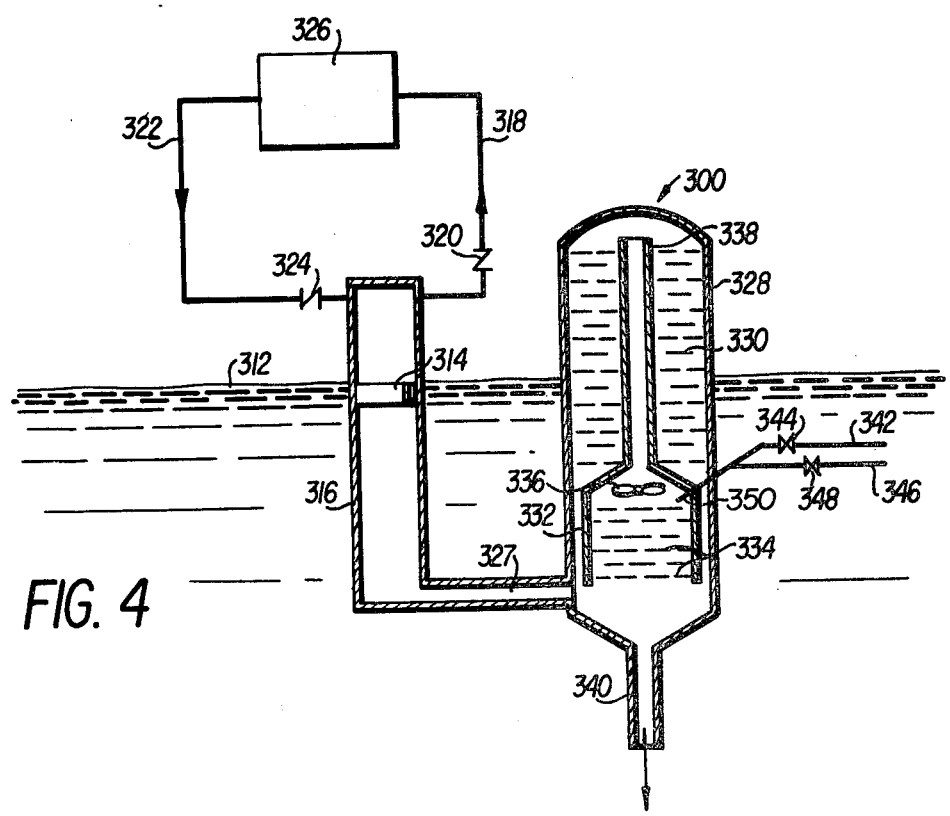
FIG. 4 is a schematic side view of an OTEC plant constructed in accordance with the present invention and designed for ocean surface location operation.

The system arrangement using a "free piston"/water turbine is illustrated in FIG. 4. The lower side of the piston connects to the air working chamber, while the zone above the piston is kept filled with water supplied from a low pressure reservoir. The piston moves through the cylinder and is sealed at its edges to prevent substantially leakage. At the top of the cylinder are connections to low and high pressure water reservoirs or mainfolds, each connection provided with a suitable check valve which allows flow in only one direction.

During expansion of the gas in the working chamber, the piston moves up, forcing water into the high pressure manifold, while connection to the low pressure manifold is closed off by the check valve. In the next part of the cycle, gas in the working chamber is cooled, causing the piston to move downward, during which access to the high pressure manifold is closed off by the check valve and the other check valve opens to allow water to flow into the cylinder from the low pressure manifold.

This arrangement then transforms energy into the form of a high pressure water source, and a low pressure receiver. Multiple systems and reservoirs will allow a continuous smooth water flow, which can be passed through a turbine to generate electricity or to provide shaft work as desired.

While described as an alternative for simplicity, this system can be combined with a single or double-acting gas piston. Thus, the gas piston can be used to drive a water piston of smaller diameter to give increased pressure differential and thereby permit using a smaller and less costly water turbine.

Now referring to FIG. 4, reference numeral 300 designates an OTEC plant designed to operate at a location at the ocean surface 312. OTEC plant 300 includes a free piston 314 which is operatively disposed in vertical cylinder 316. At its upper end cylinder 316 communicates with a high pressure water line 318 provided with a check valve 320 and with a low pressure water line 322 provided with a check valve 324. High pressure water line 318 communicates with the high pressure side of turbine 326 and low pressure water line 322 communicates with the low pressure side of turbine 326.

At its lower end cylinder 316 communicates via conduit 327 with a tank 328 which is provided in its upper portion with a plurality of vertically spaced baffles 330. In its lower portion, tank 328 is provided with a contacting chamber 332 which contains a plurality of vertically spaced gas-liquid contacting trays 334. In its upper portion, chamber 332 is provided with a fan 336 and communicates with a vertically and centrally aligned conduit 338 which is disposed in the middle of baffle 330. At its bottom, tank 328 is provided with a drain line 340. Chamber 332 is provided with a warm water inlet line 342 having a valve 344 therein and with a cold water inlet line 346 having a valve 348 therein, which communicates with spray line 350 which enters the upper portion of chamber 332.

The operation of OTEC plant 300 is as follows, starting at the point where piston 314 is at its lowermost position in cylinder 316 and where cylinder 316 is filled with water above piston 314. At this condition, tank 328 is at its lowest temperature with cold water being sprayed into chamber 332 through cold water inlet line 346 with valve 348 open. Fan 336 is operating continuously and is circulating air up through conduit 338 to the top of tank 328 and then downwardly around the outside of conduit 338 and chamber 332 and then upwardly through the interior of chamber 332. At this point, the cold water spray is stopped by shutting valve 348 and the water is allowed to drain from chamber 332 through drain line 340.

At this point, warm water is introduced into chamber 332 via conduits 342 and 350 by opening valve 344 to thereby warm the air in tank 328. As a result, the air expands moving piston 314 upward which in turn increases the pressure of the water in cylinder 316 above piston 314, so that the water flows through high pressure conduit 318 and check valve 320 which allows flow only in one direction (upward in FIG. 4). The spent warm water drains downward from chamber 332 and out through drain line 340. At this point, piston 314 reaches its highest point with the air in tank 328 at its highest temperature. The warm water supply is then shut off by closing valve 344 in line 342 and allowing the warm water to drain.

At this point, cold water is introduced into chamber 332 via conduits 346 and 350 by opening valve 348. This results in cooling the air in tank 328 which causes it to contract pulling piston 314 downward. In this operation, check valve 320 automatically closes while check valve 324 in low pressure water line 322 opens to fill the cylinder 316 above piston 314. While the average gas pressure in tank 328 decreases, piston 314 moves downwardly reaching its lowest point which is the starting point in the operation referred to above. As a result of water flowing from high to low pressures through conduits 318 and 322, power is generated in turbine 326 by the passage of water therethrough.

Figure 5:
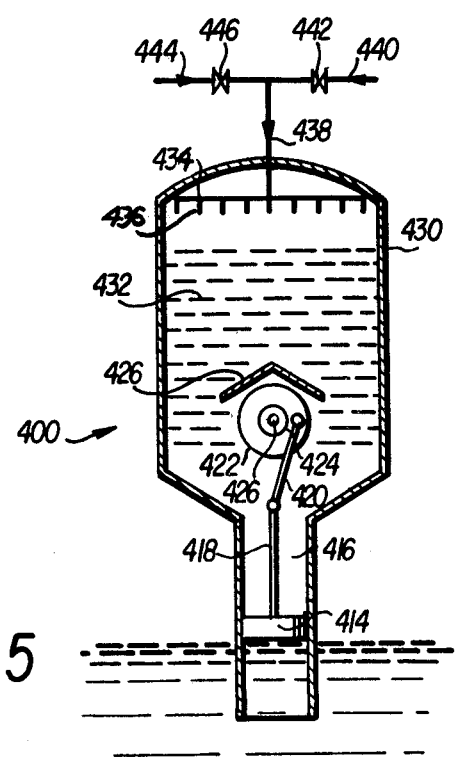
FIG. 5 is a schematic side view of a modification of the OTEC plant of FIG. 4 in which the free piston system of FIG. 4 is replaced with a floating piston.

Instead of the free piston system shown in FIG. 4, useful power can be extracted by the method shown in FIG. 5. In this alternative, gas within the tank is alternatively warmed and cooled by water sprays causing the gas to expand and then contract, thereby moving a floating piston at the bottom of the tank. The arrangement allows the piston to drive the flywheel while minimizing friction. This particular example operates with a relatively low pressure ratio between maximum and minimum pressures, resulting in a relatively high proportion of the heat load being as sensible heat for warming or for cooling the gas. However, there is an accompanying advantage in that the water streams can then be cooled or warmed over a greater temperature range since greater countercurrent contacting becomes practical. Flow rates of water are thereby decreased.

A variation is to flow the gas from a tank at higher pressure (warm) to one at lower pressure (and cold) through a turbine which recovers energy. Continuous operation of the turbine can be achieved using multiple tanks. Thus, each tank will be depressured through a series of steps, while a similar series of tanks will be going through stepwise increases in pressure. Connections are then made to appropriate tanks via switching valves and manifolds in order to hold constant pressure in or out of each specific turbine. These turbines will then operate at several different levels of pressure. At any given time, the tank at highest pressure will connect through the turbine to a tank which is at the highest pressure step in the cold part of the cycle.

Now referring to FIG. 5, reference numeral 400 designates an OTEC plant designed in accordance with the present invention for operating at a location at the ocean surface. OTEC plant 400 is provided with a floating piston 414 operationally disposed in vertically aligned cylinder 416. Piston 414 is operatively connected by means of connecting rods 418 and 420 to flywheel 422 which in turn is operatively connected to turbine 424 by means of drive shaft 426.

Flywheel 422 and turbine 424 are disposed in the bottom portion of tank 430 which is provided in its upper portion with a plurality of vertically spaced horizontal contacting devices 432 such as baffles, trays or the like. Flywheel 422 and turbine 424 have a shield 426 disposed above them to protect them against water passing downwardly in tank 430. At the uppermost part of tank 430, there is provided a manifold 434 having a plurality of water sprays 436. Manifold 434 communicates with conduit 438 which in turn communicates with cold water supply line 440 having valve 442 and warm water supply line 444 having valve 446.

OTEC plant 400 operates as follows starting with piston 414 at its top position. At this point, tank 430 is in its cold condition with valve 442 open and cold water being sprayed into the top of tank 430 through lines 440 and 438, mainfold 434 and sprays 436. Valve 442 is then closed to shut off the supply of cold water and the water is drained out of tank 430 and cylinder 416 around piston 414 which is loose fitting.

At this point warm water is introduced by pumping into the top of tank 430 through lines 444 and 438, manifold 434 and sprays 436. This results in the air in tank 430 warming up and expanding, which in turn pushes the water level down in cylinder 416 and piston 414 moves downwardly driving flywheel 422 and turbine 424 via drive shaft 426, in a manner similar to the operation of OTEC plants 10, 100 and 200. During this operation, the spent warm water drains around piston 414 and piston 414 moves to its lowermost position as the air warms up.

At this point, the warm water supply in shut off by closing valve 446 in line 444 and cold water is introduced into tank 430 by opening valve 442 in cold water supply line 440. The cold water cools the air in tank 430 and it contracts, resulting in a rise in the water level around piston 414 which in turn rises in cylinder 416, driving flywheel 422 and turbine 424. As cold water continues to be sprayed into tank 430, the air is cooled until piston 414 reaches its uppermost position, which brings it to the starting point referred to above.

Of course, the alternative methods and equipment disclosed can be combined in arrangements different from those shown in the figures and examples to satisfy specific needs. Thus, while I have described certain preferred forms of my invention and certain methods of its use, it will be understoood that this invention may be otherwise embodied within the scope of the following claims:

What is claimed is:

1. A method of energy conversion which comprises alternately contacting a confined gas with relatively warm liquid to expand said gas and with relatively cool liquid to contract said gas to thereby produce a pressure differential under conditions wherein the working gas is expanded to a volume greater than that which would result from the change in temperature alone and producing work by means of said pressure differential.

2. A method according to claim 1 wherein said warm and cold liquids are directly obtained from and returned to the environment without substantial heat being transferred thereto or therefrom for use in said method.

3. A method according to claim 1 wherein the gas-liquid contacting is carried out indirectly by first contacting said liquids with a solid heat exchange material and then contacting said solid heat exchange material with said gases.

4. A method according to claim 1 wherein said relatively warm liquid is produced from a source heated by solar energy.

5. A method according to claim 1 wherein said liquid is water and said gas is air.

6. A method according to claim 5 wherein said relatively warm water is provided from a geothermally heated source.

7. A method according to claim 5 wherein said relatively warm water is provided from a nuclear reactor.

8. A method according to claim 5 wherein said relatively warm water and relatively cool water are provided from the ocean.

9. A method according to claim 8 wherein said relatively warm water is at a temperature of about 75° to 85° F. and said relatively cool water is at a temperature of about 40° to 50° F.

10. A method according to claim 8 wherein the temperature change of said water in the contacting step is at least 10° F. and the temperature change of said air in the contacting step is at least 30° F.

11. A method according to claim 8 wherein the cycle time of alternatively heating and cooling said gas is less than about 0.01 hours.

12. A method according to claim 8 wherein said warm water is contacted by spraying with air in a first contacting zone which communicates with one side of a piston and said cool water is contacted by spraying with air in a second contacting zone which communicates with the other side of said piston.

13. A method according to claim 12 wherein the water sprays are stopped before said piston has travelled to its extreme end position.

14. A method according to claim 12 wherein the water spraying is discontinued before the expansion and contraction portions of said cycle are completed.

15. An energy conversion system which comprises
means for providing a source of relatively warm water,
means for providing a source of relatively cool water,
means for contacting a confined gas with said relatively warm water to thereby expand said gas,
means for contacting said gas with said relatively cool water to thereby contract said gas,
means for alternately contacting said gas with said warm water and said cool water to thereby alternately warm and cool said gas in a cycle to thereby produce a pressure differential,
means for putting in work in the expansion portion of said cycle and for taking out work in the contraction portion of said cycle under conditions wherein the working gas is expanded to a volume greater than that which would result from the change in temperature alone, and
means for producing work by means of the pressure differential of said gas.

16. An energy conversion system according to claim 15 wherein said means for putting in work and taking out work comprises a flywheel.

17. An energy conversion system according to claim 15 wherein each of the contacting means comprises a bed of solid heat exchange material and means for alternately contacting said water with said solid heat exchange material and then said gas with said solid heat exchange material.

18. An energy conversion system according to claim 15 wherein said means for putting in work and taking out work comprises a free-floating piston.

19. An energy system according to claim 15 wherein said means for producing work comprises a turbine.

20. A system according to claim 15 wherein said warm and cold water are directly obtained from and returned to the environment without substantial heat being transferred thereto or therefrom for use in said system.

21. An energy conversion system according to claim 15 wherein the source of relatively warm and cold water is the ocean and said gas is air.

22. An energy conversion system according to claim 21 wherein the contacting means and work producing means are located at substantially the ocean surface and the average air pressure is in the range of about 1 to 5 atmospheres.

23. An energy conversion system according to claim 21 wherein the contacting means and work producing means are located at an ocean depth of about 200 to 600 feet and the average air pressure is in the range of about 5 to 10 atmospheres.

24. An energy conversion system according to claim 21 wherein the contacting means and work producing means are located at substantially the ocean bottom and the average air pressure is greater than about 10 atmospheres.

25. An energy conversion system according to claim 21 including a plurality of solar collectors adapted to warm water and to provide the source of relatively warm water.

26. An energy conversion system which comprises
means for providing a source of relatively warm liquid,
means for providing a source of relatively cool liquid,
means for alternately contacting a confined gas with said warm liquid to expand said gas and with said cool liquid to contact said gas in a cycle to thereby produce a pressure differential,
means for putting in work in the expansion portion of said cycle and for taking out work in the contraction portion of said cycle under conditions wherein the working gas is expanded to a volume greater than that which would result from the change in temperature alone, and
means for producing work by use of the pressure differential of said gas.

27. An energy conversion system according to claim 26 wherein said means for putting in work and taking out work comprises a flywheel.

28. An energy conversion system according to claim 26 wherein said means for putting in work and taking out work comprises a free-floating piston.

29. An energy conversion system according to claim 26 wherein said means for producing work comprises a turbine.

30. A system according to claim 26 wherein said warm and cold liquids are directly obtained from and returned to the environment without substantial heat being transferred thereto or therefrom for use in said system.

31. An energy conversion system according to claim 26 wherein said liquid is water and the sources of relatively warm and cool water is the ocean and said gas is air.

32. An energy conversion system according to claim 31 including a plurality of solar collectors adapted to warm water and provide the source of relatively warm water.

33. An energy conversion system according to claim 32 including means for returning the warm water used to contact the air to said solar collectors for reheating and subsequent use in heating said air.

* * * * *